United States Patent Office 3,480,684
Patented Nov. 25, 1969

3,480,684
DEHYDROCYCLIZATION PROCESS AND
CATALYST
Rowland C. Hansford, 19463 Oriente Drive,
Yorba Linda, Calif. 92686
No Drawing. Filed Aug. 21, 1967, Ser. No. 661,777
Int. Cl. C07c 5/24; B01j 11/06
U.S. Cl. 260—673.5                    16 Claims

ABSTRACT OF THE DISCLOSURE

Paraffin hydrocarbons are converted to aromatic hydrocarbons by dehydrocyclization at elevated temperatures and low pressures, in the presence of a catalyst comprising an intimate mixture of alumina and chromium oxide, upon which is deposited a minor proportion of a promoter selected from the class consisting of the oxides of niobium and tantalum, and preferably a minor proportion of an inhibitor selected from the class consisting of the oxides of the alkali metals and the alkaline earth metals.

Background and summary of the invention

The invention relates to the dehydrogenation and cyclization of paraffin hydrocarbons to produce aromatic hydrocarbons therefrom, the principal novel feature of the process residing in the use of a new class of metal oxide catalysts, which catalysts are found to be more active and more selective than other metal oxide catalysts of the prior art.

It is well known that paraffin hydrocarbons containing six or more carbon atoms can be converted to aromatic hydrocarbons by heating at high temperatures and low pressures. However, the thermal conversion is highly inefficient due to competing reactions of cracking and the polymerization of unsaturated intermediates, leading respectively to the production of large amounts of gaseous hydrocarbons and heavy polymers. It is reported that a more selective conversion can be obtained by the use of Group VI-B metal oxide catalysts supported on alumina (U.S. Patent No. Re. 21,486). Data reported herein shows however that these catalysts have a relatively low activity. Moreover, they tend to become rapidly deactivated by coke-like deposits arising from the polymerization of olefinic intermediates and/or the condensation of olefins with aromatic hydrocarbons.

As is well known, alumina contains active surface acidity which tends to promote the isomerization of n-paraffins to iso-paraffins. Upon dehydrogenation isoparaffins yield unsaturated hydrocarbons which tend to polymerize rather than cyclize, and which can also condense with aromatic hydrocarbons to produce polycyclic aromatics, all resulting ultimately in the formation of coke. The surface acidity of the alumina also tends to promote cracking with resultant production of gaseous hydrocarbons. Attempts have previously been made to reduce the amount of hydrocracking and isomerization by adding alkali metal oxides to alumina-based catalysts to thereby reduce their surface acidity, but these attempts have heretofore been only partially successful, and the resulting catalysts are still deficient in intrinsic activity.

In U.S. Patent No. 2,337,190, an improved alkali metal-inhibited, chromia-alumina dehydrocyclization catalyst is disclosed, containing a cerium oxide promoter. The present invention is based upon my discovery that the oxides of niobium (columbium) and/or tantalum constitute even more effective promoters for chromi-alumina catalysts than the cerium oxide promoter of said patent. Thus, the promoted catalysts of this invention are found to be not only more active for dehydrocyclization than the cerium oxide-promoted catalysts, but in most cases they are more selective, giving higher yields of desired aromatic hydrocarbons and lower yields of coke and light gases.

Catalyst details

The alumina base employed herein may comprise any of the well known activated aluminas of commerce, or described in the literature. Suitable activated aluminas include for example gamma alumina, eta alumina, kappa alumina, theta alumina, etc., as well as calcined crude aluminas such as bauxite. Suitable activated aluminas, normally in the gamma form, may be prepared by conventional methods of precipitation of aluminum hydroxide from solutions of aluminum salts with bases such as ammonium hydroxide, followed by washing, drying and calcining to activate the precipitated gels. It is preferred to employ aluminas having a surface area in the range of about 100 to 400 sq. meters per gram.

The active components of the catalyst may be added to the alumina base in any desired order, and by conventional methods known in the art. Suitable methods include for example impregnation with aqueous solutions of salts of the desired metals; coprecipitation of alumina gel along with any one or more hydrous oxides or hydroxides of the remaining desired metals, followed by impregnation with salt solutions of any remaining desired metals; separate precipitation of the hydrogels of alumina, chromia, and an oxide or hydroxide of niobium and/or tantalum, followed by intimate mixing of the resulting slurries, the alkali inhibitor being added by impregnation after calcining of the composited gels, or by any such similar methods. When alkali metal oxide inhibitors are employed, it is preferred that they be added by a final impregnation step so as to avoid leaching out soluble metal hydroxides during subsequent impregnation and/or co-slurrying steps. But the insoluble hydroxides of the alkaline earth metals may be added at any convenient stage in the manufacture. Grinding or ball milling of powdered alumina and chromia may be utilized in some cases, followed by impregnation with salts of niobium and/or tantalum and with salts of the desired alkali metals and/or alkaline earth metals. It will be understood that any method of compositing the desired components is contemplated which gives a sufficiently intimate and homogeneous admixture.

The active metal oxides (i.e. the oxides of chromium, niobium and/or tantalum, alkali metal and/or alkaline earth metal) are preferably derived from water soluble salts of the respective metals with readily decomposable anions such as nitrate, acetate, oxalate or the like. This is especially desirable where the active metal or metals are added by impregnation (which precludes the removal of undesired anions by water washing). It will be understood that the preferred salts of decomposable anions are converted to the corresponding metal oxides upon final calcination of the catalyst composite in air.

Following the final addition of active components, the wet composite is ordinarily drained, dried at relatively low temperatures, and calcined in air at temperatures of about 700–1400° F. Normally, the catalyst is employed in the form of pellets or granules of substantially uniform size ranging between about $\frac{1}{16}''$ and $\frac{3}{8}''$ diameter. The pelleting may be carried out at any desired stage of the manufacture prior to the final calcining step. In some cases, the catalyst may be employed in a powder form. The finished catalysts normally will fall within the following composition ranges:

TABLE 1

|  | Weight Percent | |
| --- | --- | --- |
|  | Broad Range | Preferred Range |
| $Al_2O_3$ | 30–95 | 50–85 |
| $Cr_2O_3$ | 1–50 | 10–40 |
| $Nb_2O_5$ $Ta_2O_5$ | 0.1–10 | 1–5 |
| Alkali metal Alkaline earth metal oxides | 0.5–15 | 2–10 |

The preferred alkaline inhibitors comprise the oxides of potassium, rubidium, calcium, and strontium, in that they yield catalysts of higher apparent activity than do the remaining alkali metal and alkaline earth metal oxides. The oxides of rubidium and strontium are additionally preferred because they appear to give better selectivity of conversion.

Specifically contemplated exemplary catalyst compositions are as follows:

TABLE 2

|  | Weight Percent | | | |
| --- | --- | --- | --- | --- |
|  | $Al_2O_3$ | $Cr_2O_3$ | Promoter | Inhibitor |
| Catalyst Number: | | | | |
| 1 | 73 | 20 | 2 ($Nb_2O_5$) | 5 ($Rb_2O$). |
| 2 | 79.5 | 10 | 1.5 ($Nb_2O_5$) | 8 (CaO). |
| 3 | 67.5 | 25 | 2.5 ($Nb_2O_5$) | 5 ($K_2O$). |
| 4 | 52.5 | 40 | 3.5 ($Nb_2O_5$) | 4 (SrO). |
| 5 | 64.5 | 25 | 2.5 ($Nb_2O_5$) | 8 (BaO). |
| 6 | 67.5 | 25 | 2.5 ($Nb_2O_5$) | 2.5 ($Rb_2O$), 2.5 (CaO). |
| 7 | 67 | 25 | 3 ($Ta_2O_5$) | 5 ($K_2O$). |
| 8 | 69 | 25 | 3 ($Ta_2O_5$) | 3 ($Li_2O$). |
| 9 | 68 | 25 | 3 ($Ta_2O_5$) | 4 ($Na_2O$). |
| 10 | 67.5 | 25 | 1.5 ($Nb_2O_5$), 1 ($Ta_2O_5$) | 5 (SrO). |

Feedstocks

From an operative standpoint, substantially any hydrocarbon feedstock may be employed herein which contains a substantial proportion of paraffin hydrocarbons containing at least six carbon atoms in a straight chain, and a total of 6 to about 12 carbon atoms. For practical purposes however it is preferred to utilize substantially pure normal paraffin feeds, e.g. n-hexane, n-heptane, n-octane, n-decane, etc. Benzene is produced in good yields from n-hexane; toluene from n-heptane, and xylenes from substantially any octane isomer containing at least six carbon atoms in a straight chain. In any case however it is preferred to employ feedstocks which contain a minimum of iso-paraffins.

Process conditions

The process is normally carried out in conventional fashion by passing the vaporized and preheated feed through a bed of the catalyst. Interstage heating is ordinarily desirable, since the reaction is highly endothermic. A problem of some moment in achieving maximum efficiency in the process resides in the choice of whether added hydrogen is to be employed in the contacting, and if so the choice of a suitable hydrogen partial pressure to be maintained. It has been found that the dehydrocyclization activity of the present catalysts is somewhat repressed by hydrogen, but on the other hand if hydrogen is not employed their deactivation rate is generally increased. In any case, hydrogen pressures in excess of about 300 p.s.i.g. are undesirable in that they tend thermodynamically to repress the dehydrocyclization reaction. These considerations lead to the conclusions that if maximum catalyst activity is the paramount economic consideration the process should be carried out without added hydrogen, but if economic considerations dictate that the advantage of a longer run length would outweigh some sacrifice in catalyst activity, sufficient hydrogen should be used to maintain minimal partial pressures thereof of about 15 to 300 p.s.i., preferably about 50–200 p.s.i. These hydrogen partial pressures give in many cases an optimum compromise between maximum activity and maximum run lengths between catalyst regenerations.

In summary, the contemplated major process conditions are as follows:

TABLE 3

|  | Broad Range | Preferred Range |
| --- | --- | --- |
| Temperature, °F | 800–1,200 | 850–1,050 |
| Pressure, p.s.i.a | 15–300 | 50–200 |
| $H_2$/feed mole-ratio | 0–30 | 1–10 |
| Contact Time, sec | 0.1–50 | 0.5–5 |
| LHSV (vol. liquid feed/vol. catalyst/hr.) | 0.1–10 | 0.2–2 |
| Vol. Percent Conversion/pass | 10–80 | 20–60 |

The following examples are cited to illustrate the invention and the results obtainable, but are not to be construed as limiting in scope:

Example I

As unpromoted chromia-alumina catalyst was prepared as follows:

Alumina hydrogel was precipitated from a solution of 1030 g. of $Al(NO_3)_3 \cdot 9H_2O$ dissolved in 2,000 ml. of water by the addition of an ammonia solution prepared by diluting 940 ml. of concentrated (28%) ammonia with 3020 ml. of water. The final pH was 9.7.

Chromia hydrogel was similarly precipitated from a solution of 316 g. of $Cr(NO_3)_3 \cdot 9H_2O$ dissolved in 900 ml. of water by the addition of an ammonia solution prepared by diluting 295 ml. of 28% ammonia with 1300 ml. of water. The final pH was also 9.7.

The two hydrogel slurries were thoroughly mixed with a high-speed stirrer to form a homogeneous mixture. This was filtered and washed to remove soluble salt. The washed filter-cake was dried at 220° F. for six hours, granulated, and calcined two hours at 1112° F. The surface area (BET method) was 209 square meters per gram. The nominal composition was 70% $Al_2O_3 \cdot 30\%$ $Cr_2O_3$ (by weight).

Example II

By the identical method described in Example I, a mixed hydrogel was prepared to give a final product having a nominal composition of 70% $Al_2O_3 \cdot 27.5\%$ $Cr_2O_3 \cdot 2.5\%$ $Nb_2O_5$. The source of the niobium oxide was the oxalate, and it was coprecipitated with the chromia hydrogel by ammonia before mixing with the alumina hydrogel. The surface area of this preparation after calcination at 1112° F. was 240 square meters per gram.

Example III

Alkali or alkaline-earth metal oxides were added to the dried (not calcined) mixed hydrogels of Examples I and II by soaking in an aqueous solution of the appropriate nitrate, drying and calcining at 1000° F. for 12 hours. In all cases enough nitrate was impregnated into the combined dried hydrogels to give 5 weight-percent of the corresponding oxide, based on total composite including the alumina.

Example IV

The catalysts prepared as described above were evaluated in a micro-reactor to which was attached a gas chromatograph for analyzing the product stream. A carrier gas (helium) was passed into a packed vessel containing liquid-n-heptane thermostatted at 20° C. From the saturator the stream of carrier gas plus n-heptane vapor was passed through a preheater and into the reactor at a rate of 50 ml. per minute, giving a liquid hourly space velocity of about 0.75 volume of liquid n-heptane per volume of catalyst per hour, and a contact time of about 0.5 second or less. Conversions and yields were determined at three different temperature levels for each catalyst and conversion-temperature curves were plotted in each case, and from the resulting curves the temperatures required for 25% and 50% conversion were picked off and tabulated as follows:

TABLE 4

| Catalyst | Composition, Weight Percent | Temp., °F. For 25% Conversion [a] | Temp., °F. For 50% Conversion [a] | Selectivity to Toluene [b] at ( )% Conversion |
|---|---|---|---|---|
| A (Ex. I) | 70% Al$_2$O$_3$-30% Cr$_2$O$_3$ | 999 | 1,053 | 71 (48) |
| B (Ex. III) | Cat. A plus 5% K$_2$O | 950 | 988 | 85 (48) |
| C (Ex. II) | 70% Al$_2$O$_3$-27.5% Cr$_2$O$_3$-2.5% Nb$_2$O$_5$ | 847 | 1,008 | 64 (42) |
| D (Ex. III) | Cat. C plus 5% K$_2$O | 862 | 919 | 76 (50) |
| E (Ex. III) | Cat. C plus 5% Rb$_2$O | 864 | 930 | 87 (62) |
| F (Ex. III) | Cat. C plus 5% CaO | 851 | 910 | 75 (51) |
| G (Ex. III) | Cat. C plus 5% SrO | 838 | 912 | 83 (49) |
| H (Ex. III) | Cat. C plus 5% BaO | 873 | 925 | 75 (40) |

[a] Conversion=Disappearance of n-heptane to all products.
[b] Percent of feed converted which went to toluene.

From the foregoing data it is evident that small amounts of niobium oxide promote the activity of chromia-alumina catalysts for the dehydrocyclization of n-paraffins, lowering the temperature required for 50% conversion by about 45° F. (compare Catalysts A vs. C). A similar promotional effect is obtained by using mole-equivalent proportions of tantalum oxide.

It is evident also that small amounts of alkali or alkaline earth metal oxides improve activity and selectivity of the catalysts (compare Catalyst A vs. B; also Catalysts D through H vs. Catalyst C). It is also apparent that the oxides of rubidium and strontium are most effective in respect to selectivity, while calcium, strontium and potassium give the highest overall activity.

Example V

A cerium oxide-promoted chromia-alumina catalyst analogous to those described in U.S. Patent No. 2,337,190 was prepared as follows: Activated 14–40 mesh alumina was soaked in aqueous chromic acid, dried at 220° F. for 4–5 hours, then again soaked in an aqueous solution of cerium and potassium nitrates, again dried and finally calcined at 932° F. The resulting catalyst analyzed 81.5% Al$_2$O$_3$-16% Cr$_2$O$_3$-1.5% K$_2$O-1.0% CeO$_2$ by weight. On testing this catalyst for the dehydrocyclization of n-heptane under conditions described in Example IV, it was found that a temperature of 900° F. was required for 25% conversion, and 937° F. for 50% conversion. The selectivity of conversion was 72%. Thus, the cerium oxide-promoted catalyst is less active than the niobium-promoted catalysts of the present invention. The superiority of the niobium-promoted catalysts becomes even more apparent when they are prepared by impregnation methods.

It is not intended that the invention should be limited to the details described above since many variations may be made by those skilled in the art without departing from the scope and spirit of the following claims:

1. A method for the dehydrocyclizing of paraffins which comprises contacting a paraffinic hydrocarbon feedstock at a temperature within the range of about 800° F. to about 1200° F. with an admixture of alumina, a minor proportion of chromium oxide, and a promoting amount of at least one oxide of niobium and tantalum oxide.

2. The method of claim 1 wherein said paraffinic feedstock is contacted with a composition consisting essentially of an intimate admixture of from about 30 to about 95 weight percent activated alumina, from about 1 to about 50 weight percent chromium oxide, and a promoting amount of at least one of niobium oxide and tantalum oxide.

3. The method of claim 1 wherein said paraffinic feedstock comprises a substantial proportion of paraffinic hydrocarbons having at least 6 carbon atoms in straight chain paraffinic linkage, and said feedstock is contacted at a temperature of from about 800 to about 1200° F. with a dehydrocyclization catalyst consisting essentially of an intimate admixture of from about 30 to about 95 weight percent activated alumina having a surface area of from about 100 to about 400 square meters per gram, from about 1 to about 50 weight percent chromium oxide, and from about 0.1 to about 10 weight percent of at least one of niobium oxide and tantalum oxide, said oxide being deposited on said intimate admixture of said alumina and chromium oxide.

4. The method of claim 3 wherein said feedstock consists essentially of paraffinic hydrocarbons having from about 6 to about 12 carbon atoms per molecule and having at least about 6 carbon atoms in straight chain paraffinic linkage and said catalyst comprises from about 50 to about 85 percent of said alumina, from about 10 to about 40 weight percent of said chromium oxide, and from about 1 to about 5 percent of said niobium oxide and/or said tantalum oxide.

5. The method of claims 1, 2, 3 and 4 wherein said composition with which said paraffinic feedstock is contacted further comprises a dehydrocyclization inhibiting amount of at least one oxide of the alkali and alkaline earth metals.

6. The method of claims 1, 2, 3, 4 and 5 wherein said paraffinic feedstock is contacted with said composition in the presence of up to about 30 moles of hydrogen per mole of said paraffinic feedstock.

7. The method of claim 1 wherein said paraffinic feedstock comprises predominately paraffinic hydrocarbons having at least 6 carbon atoms in straight chain paraffinic linkage, said feedstock is contacted at a temperature of from about 800 to about 1200° F. at a pressure from about 15 to about 300 p.s.i., for a period of from about 0.1 to about 50 seconds with a dehydrocyclization catalyst consisting essentially of from about 30 to about 95 weight percent alumina in intimate admixture with from about 1 to about 50 weight percent chromium oxide, from about 0.1 to about 10 weight percent of at least one of niobium oxide and tantalum oxide deposited on said admixture of said alumina and said chromium oxide, and from about 0.5 to about 15 percent of at least one oxide of the alkali and alkaline earth metals based on the total combined weight of said alumina, chromium oxide, niobium oxide and tantalum oxide, said contacting being effected in the presence of from about 1 to about 10 moles of hydrogen per mole of said paraffinic feedstock.

8. As a hydrocarbon conversion catalyst an intimate admixture of activated alumina and chromium oxide having deposited thereon a promoting amount of at least one of niobium oxide and tantalum oxide.

9. The composition of claim 8 further comprising an inhibiting amount of at least one oxide of the alkali and alkaline earth metals and wherein the relative proportions of the several components are from about 30 to about 95 weight percent of said alumina, from about 1 to about 50 weight percent of said chromium oxide, and from about 0.1 to about 10 weight percent of said niobium and tantalum oxides based on the combined weight of said alumina, chromium oxide, niobium oxide and/or tantalum oxide.

10. The composition of claim 8 wherein said activated alumina has a surface area of from about 100 to about 400 square meters per gram and said composition consists essentially of from about 30 to about 95 weight percent alumina, from about 1 to about 50 weight percent chromium oxide, from about 0.1 to about 10 weight percent of at least one of niobium oxide and tantalum oxide and from about 0.5 to about 15 weight percent of at least one oxide of the alkali and alkaline earth metals.

11. The method of preparing the catalyst composition of claim 8 which comprises contacting at least one form of activated alumina with an aqueous solution of a thermally decomposable chromium salt and impregnating said alumina with said chromium salt, separating the thus impregnated alumina from said aqueous solution, heating the thus impregnated alumina to a temperature sufficient to decompose said chromium salt and convert same to chromium oxide, contacting the resultant composition with an aqueous solution of at least one thermally decomposable salt of at least one of niobium and tantalum and impregnating said composition with said salt, separating the resultant last said impregnated composition from said last aqueous solution and heating the thus separated impregnated alumina at a temperature and for a period of time sufficient to decompose said last thermally decomposable salt and convert same to the corresponding oxide of at least one of niobium and tantalum.

12. The method of claim 11 wherein the anion of said thermally decomposable salts of chromium, niobium and tantalum is selected from nitrate, acetate and oxalate.

13. The method of preparing the catalyst composition of claim 8 which comprises contacting an aqueous solution of aluminum nitrate with a sufficient amount of base to precipitate an alumina hydrogel, contacting a second solution of chromium nitrate and a water soluble salt of at least one of niobium and tantalum with sufficient base to co-precipitate a hydrogel of chromium and at least one of niobium and tantalum oxides, intimately admixing said last hydrogel and said alumina hydrogel, separating the resultant supernatant aqueous phase from the resultant admixture and calcining said admixture.

14. The method of claim 13 wherein the anion of said aluminum, chromium, niobium and tantalum salts is selected from nitrate, acetate and oxalate.

15. The method of preparing the catalyst composition of claim 9 which comprises contacting an aqueous solution of water soluble aluminum salt with a sufficient amount of base 2 precipitate and alumina hydrogel, contacting a second solution of water soluble chromium salt and water soluble salt of at least one of niobium and tantalum with sufficient base to coprecipitate a hydrogel of chromium oxide and at least one of niobium and tantalum oxides, intimately admixing said last hydrogel and said alumina hydrogel, separating the resultant admixture from the remaining aqueous phase, drying said resultant admixture, contacting the thus dried admixture with an aqueous solution of a water soluble salt selected from thermally decomposable alkali and alkaline earth metal salts and thereby impregnating said admixture with said salt, separating the thus impregnated admixture from the remaining aqueous phase and calcining the thus separated admixture at conditions sufficient to convert said last salt to the corresponding oxide.

16. The method of claim 15 wherein the anions of said salts are selected from nitrate, citrate and oxalate.

References Cited

UNITED STATES PATENTS

| 2,337,190 | 12/1943 | Greensfelden et al. | 260—673.5 |
| 2,908,655 | 10/1959 | Keith | 252—465 |
| 3,365,510 | 1/1968 | Noakes | 260—673 |

DELBERT E. GANTZ, Primary Examiner

I. NELSON, Assistant Examiner

U.S. Cl. X.R.

252—465